US010259209B2

(12) United States Patent
Czaplewski et al.

(10) Patent No.: US 10,259,209 B2
(45) Date of Patent: Apr. 16, 2019

(54) PULSED UV LIGHT NOZZLE FOR SELECTIVE CURING OF 3D PRINTED MATERIAL

(71) Applicant: International Business Machines Corporation, Armonk, NY (US)

(72) Inventors: Sarah K. Czaplewski, Rochester, MN (US); Joseph Kuczynski, North Port, FL (US); Jason T. Wertz, Pleasant Valley, NY (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 14/967,810

(22) Filed: Dec. 14, 2015

(65) Prior Publication Data
US 2017/0165914 A1    Jun. 15, 2017

(51) Int. Cl.
| B29C 35/08 | (2006.01) |
| B33Y 30/00 | (2015.01) |
| B29C 64/209 | (2017.01) |
| B29C 64/264 | (2017.01) |

(52) U.S. Cl.
CPC .......... *B33Y 30/00* (2014.12); *B29C 35/0805* (2013.01); *B29C 64/209* (2017.08); *B29C 64/264* (2017.08); *B29C 2035/0827* (2013.01)

(58) Field of Classification Search
CPC ........ B33Y 30/00; B33Y 10/00; B29C 64/264
See application file for complete search history.

(56) References Cited

U.S. PATENT DOCUMENTS

| 6,017,640 | A | 1/2000 | Muthiah et al. |
| 6,129,872 | A * | 10/2000 | Jang ........................ B29C 41/36 |
| | | | 264/245 |
| 7,967,587 | B2 | 6/2011 | Bradley |
| 9,076,082 | B1 | 7/2015 | Cudak et al. |
| 9,090,004 | B2 | 7/2015 | Kuczynski et al. |
| 2004/0024079 | A1 | 2/2004 | Erickson et al. |
| 2005/0248065 | A1* | 11/2005 | Owada .................. B29C 64/106 |
| | | | 264/494 |

(Continued)

FOREIGN PATENT DOCUMENTS

| CN | 203030471 U | 7/2013 |
| CN | 103231513 A | 8/2013 |

(Continued)

OTHER PUBLICATIONS

U.S. Appl. No. 15/000,541, entitled "Dynamic Polymer Material for 3D Printing,", as filed on Jan. 19, 2016.

*Primary Examiner* — Galen H Hauth
(74) *Attorney, Agent, or Firm* — Patterson + Sheridan, LLP

(57) ABSTRACT

A nozzle for a 3D printer has a body having a first end, a second end opposite the first end, and a material channel through the body. The body circumscribes at least a portion of the material channel. The material channel has a proximal orifice at the first end and a distal orifice at the second end. The nozzle has an ultraviolet light guide coupled with the body. The ultraviolet light guide has a first end, a second end, and a light-emitting tip with a first end and a second end. The first end of the light-emitting tip is coupled with the second end of the ultraviolet light guide.

29 Claims, 6 Drawing Sheets

(56) References Cited

U.S. PATENT DOCUMENTS

| | | | |
|---|---|---|---|
| 2014/0061974 A1* | 3/2014 | Tyler | B29C 67/0055 264/401 |
| 2014/0072777 A1 | 3/2014 | Boday et al. | |
| 2015/0183161 A1 | 7/2015 | Molinari et al. | |
| 2016/0159009 A1* | 6/2016 | Canale | B33Y 10/00 264/401 |
| 2016/0262917 A1 | 9/2016 | Chen et al. | |
| 2017/0028619 A1* | 2/2017 | Evans | B29C 69/001 |

FOREIGN PATENT DOCUMENTS

| | | |
|---|---|---|
| CN | 103231514 A | 8/2013 |
| CN | 103862678 A | 6/2014 |
| CN | 103878983 A | 6/2014 |
| CN | 203649400 U | 6/2014 |
| CN | 204095145 U | 1/2015 |
| CN | 103231513 B | 3/2015 |
| CN | 103231514 B | 3/2015 |
| JP | H08-230048 A | 9/1996 |
| WO | 2005/032827 A1 | 4/2005 |
| WO | 2005032837 A1 | 4/2005 |

\* cited by examiner

PULSED UV LIGHT NOZZLE FOR SELECTIVE CURING OF 3D PRINTED MATERIAL

The present disclosure relates to new 3D printing methods and apparatus. A new nozzle is disclosed for use in 3D printing methods, with apparatus for performing such methods.

BACKGROUND 3D printing has attracted significant attention for its potential as a new manufacturing process offering remarkable versatility in the ability to rapidly produce tailored physical objects from the micro to macro scale. While the foundations of this technology were laid in the late 1980s, modern advancements have produced 3D-printers for applications such as home use, rapid prototyping, and production of biomedical devices. While the hardware utilized in this field is rapidly maturing, the number of materials used in the printing process generally include traditional commercial polymers such as poly(methyl methacrylate). Nonetheless, hardware capable of curing a deposited 3D material is limited by curing the entirety of the deposited material. However, physical property requirements for use of some 3D printed materials/objects necessitate different physical properties across different areas of the surface of the 3D material.

There is a need in the art for improved curing methods and apparatus for curing increasingly dynamic materials at selective portions on the surface of a three dimensional object and/or curing the material after it has exited a nozzle of the 3D printer but before it is deposited onto a substrate.

SUMMARY

In some embodiments, a nozzle for a 3D printer has a body having a first end, a second end opposite the first end, and a material channel through the body. The body circumscribes at least a portion of the material channel. The material channel has a proximal orifice at the first end and a distal orifice at the second end. The nozzle has an ultraviolet light guide coupled with the body. The ultraviolet light guide has a first end, a second end, and a light-emitting tip with a first end and a second end. The first end of the light-emitting tip is coupled with the second end of the ultraviolet light guide.

In some embodiments, a three dimensional printer has a material spool and an extruder having a first end and a second end. The extruder is coupled with the material spool at the extruder first end. The three dimensional printer has a nozzle coupled to the extruder second end. The nozzle has a body having a first end, a second end opposite the first end, and a material channel through the body. The material channel has a proximal orifice at the first end and a distal orifice at the second end. The second end of the extruder is coupled to the proximal orifice, and the body circumscribes at least a portion of the material channel. The nozzle has an ultraviolet light guide coupled with the body. The ultraviolet light guide has a first end, a second end, and a light-emitting tip with a first end and a second end. The first end of the light-emitting tip is coupled with the second end of the ultraviolet light guide.

In some embodiments, a method of forming an object comprises flowing a precursor material from a dispenser onto a target location of a substrate. The method comprises selectively directing ultraviolet light from the dispenser to the target location of the substrate. The target location is less than the entire surface of the substrate. The method comprises curing the precursor material.

BRIEF DESCRIPTION OF THE DRAWINGS

So that the manner in which the above recited features of the present disclosure can be understood in detail, a more particular description of the present disclosure, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the present disclosure may admit to other equally effective embodiments.

DESCRIPTION OF EMBODIMENTS

In some embodiments, a nozzle for a 3D printer has a body having a first end, a second end opposite the first end, and a material channel through the body. The body circumscribes at least a portion of the material channel. The material channel has a proximal orifice at the first end and a distal orifice at the second end. The nozzle has an ultraviolet light guide coupled with the body. As described herein, "ultraviolet light" includes electromagnetic radiation with a wavelength from 400 nm to 100 nm. The ultraviolet light guide has a first end, a second end, and a light-emitting tip with a first end and a second end. The first end of the light-emitting tip is coupled with the second end of the ultraviolet light guide.

In some embodiments, a three dimensional printer has a material spool and an extruder having a first end and a second end. The extruder is coupled with the material spool at the extruder first end. The three dimensional printer has a nozzle coupled to the extruder second end. The nozzle has a body having a first end, a second end opposite the first end, and a material channel through the body. The material channel has a proximal orifice at the first end and a distal orifice at the second end. The second end of the extruder is coupled to the proximal orifice, and the body circumscribes at least a portion of the material channel. The nozzle has an ultraviolet light guide coupled with the body. The ultraviolet light guide has a first end, a second end, and a light-emitting tip with a first end and a second end. The first end of the light-emitting tip is coupled with the second end of the ultraviolet light guide.

Figure 1:
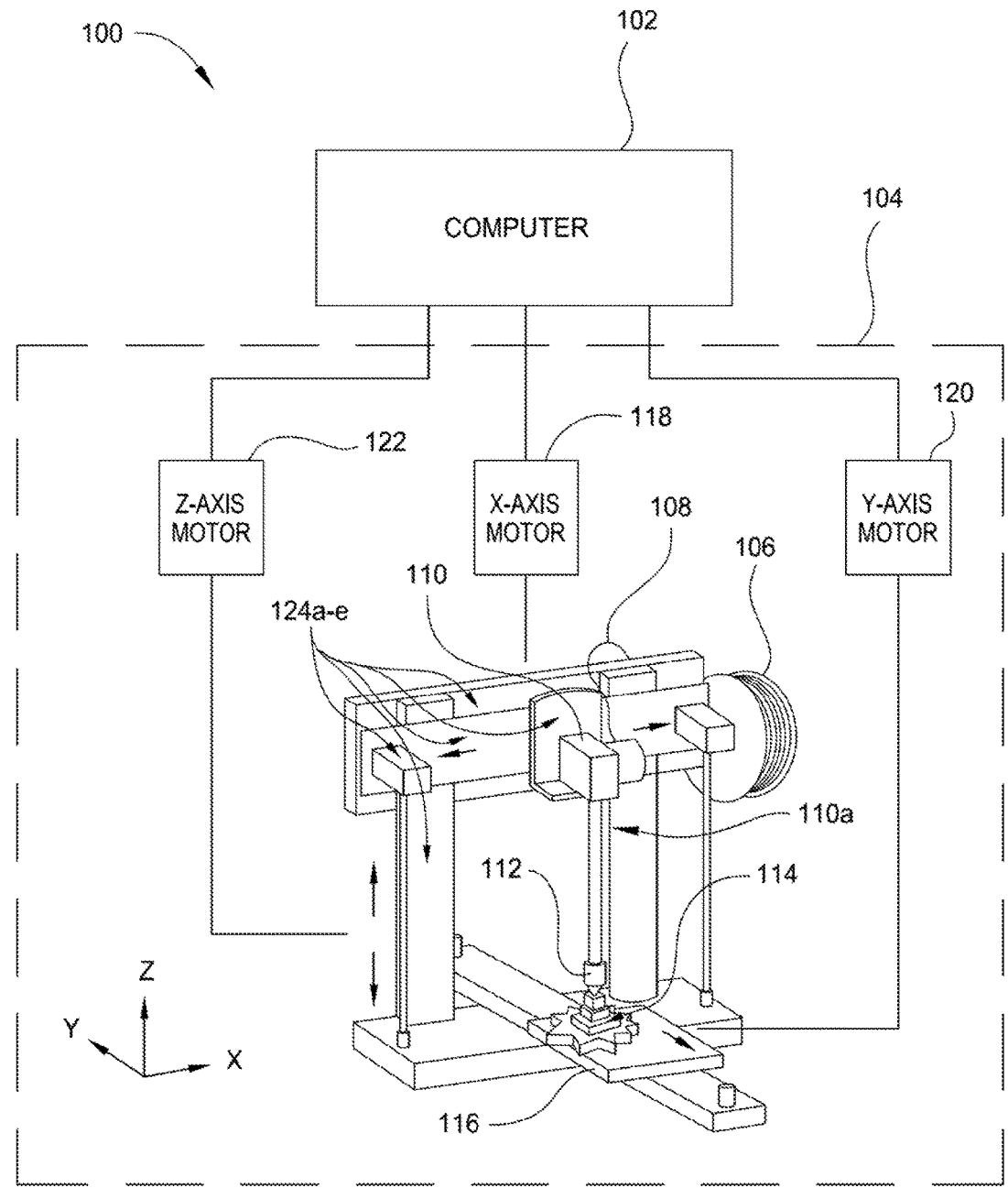
FIG. 1 illustrates a system including a computer controlling a three-dimensional printer in accordance with some embodiments.

FIG. 1 illustrates a system 100 including a computer 102 controlling a three-dimensional printer 104. As shown in FIG. 1, the three-dimensional printer 104 includes a filament spool 106 for supplying a filament 108 into an extruder 110. Extruder 110 has an extruding arm 110a. Filaments include, but are not limited to, polylactic acid (PLA), acrylonitrile butadiene styrene (ABS), high impact polystyrene (HIPS), nylon, and high density polyethylene (HDPE). The heated filament is pushed through a nozzle 112 onto a substrate 114 disposed on a print bed 116 where the three dimensional object is printed as part of the substrate 114. The three dimensional object comprises a plurality of layers of filament. A substrate may comprise one or more materials. Non-limiting examples of substrate materials include semiconductor wafers (e.g., silicon wafers), most metals, refractory materials, and other polymers. In some aspects, a substrate may be, without limitation, an electronic device, microchip, microelectronic device, printed circuit board, hard disk drive platter, a portion of a fluid filter, and portion of a hydrocarbon (e.g., petroleum, natural gas, or petrochemical) processing facility such as a pipe, pipeline, fluid pumping device, distillation column, a reaction vessel, or storage tank.

The position of the tip of the nozzle 112 determines where a thin layer of the filament will be placed. As the filament passes through the nozzle 112, the nozzle 112 may be moved back and forth along an X-axis by an X-axis motor 118, and the print bed 116 may be moved back and forth along a Y-axis by a Y-axis motor 120. As each layer has been completed in the X-Y plane, the print bed may be moved along a Z-axis (e.g., orthogonal to the X-Y plane) by a Z-axis motor 122 so that another layer of the filament may be applied through the nozzle moving along the X-axis while the object or work piece is moved along with the print bed 116 along the Y-axis. The printer 104 also includes structural members 124a-e that guide the nozzle along the X-axis, guide the print bed 116 along the Y-axis, and guide the print bed 116 along the Z-axis. The computer 102 provides instructions to the printer 104 to operate the X-axis motor 118, the Y-axis motor 120, and the Z-axis motor 122 in a manner that positions the nozzle 112 where it can print layers of filament to create the three dimensional object. In some embodiments, the nozzle 112 may be moved back and forth along an X-axis by X-axis motor 118, and/or back and forth along a Y-axis by Y-axis motor 120, and/or back and forth along a Z-axis by Z-axis motor 122. Computer 102 may additionally or alternatively control one or more ultraviolet light sources (not shown) coupled with ultraviolet light guide(s)/source(s) disposed on or within nozzle 112.

Figure 2:
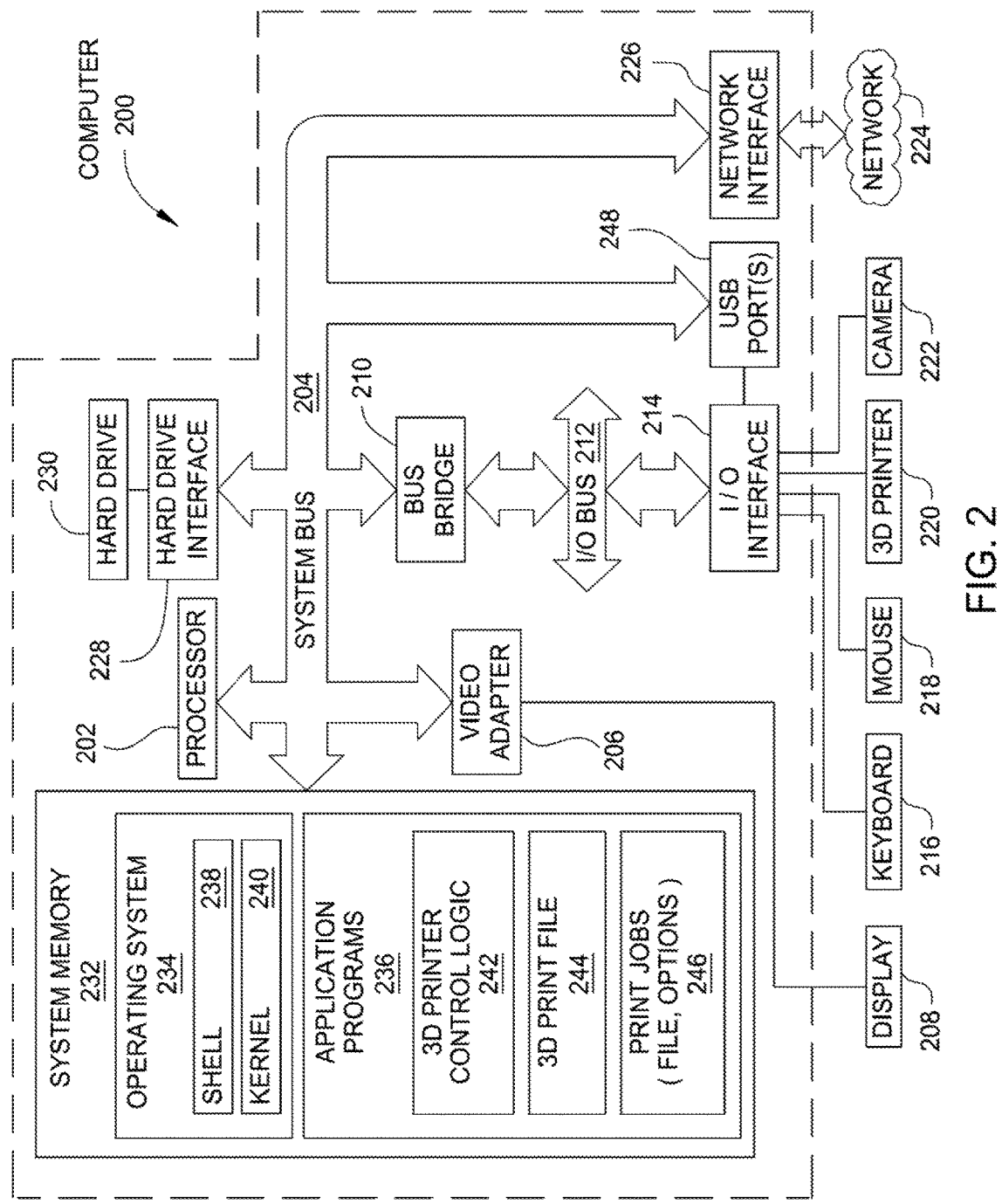
FIG. 2 illustrates a computer that may be used in accordance with some embodiments.

FIG. 2 illustrates a computer 200 that may be used in accordance with some embodiments. As shown in FIG. 2, the computer 200 includes a processor unit 202 that is coupled to a system bus 204. Processor unit 202 may utilize one or more processors, each of which has one or more processor cores. A video adapter 206, which drives/supports a display 208, is also coupled to system bus 204. The system bus 204 is coupled via a bus bridge 210 to an input/output (I/O) bus 212. An I/O interface 214 is coupled to I/O bus 212. I/O interface 214 affords communication with various I/O devices, including a keyboard 216, a mouse 218, a 3D printer 220, and a camera 222. The I/O devices may optionally include storage devices, such as CD-ROM drives and multi-media interfaces, other printers, and external USB port(s) 248. While the format of the ports connected to I/O interface 214 may any suitable format, in some embodiments, some or all of the ports are universal serial bus (USB) ports. Computer 200 is able to communicate over a network 224 using a network interface 226. The network 226 may be an external network, such as the global communication network, and perhaps also an internal network such as an Ethernet LAN or a virtual private network (VPN).

A hard drive interface 228 is also coupled to system bus 204 and interfaces with a hard drive 230. In a preferred embodiment, the hard drive 230 populates a system memory 232, which is also coupled to system bus 204. System memory is defined as a lowest level of volatile memory in computer 200. This volatile memory includes additional higher levels of volatile memory (not shown), including, but not limited to, cache memory, registers and buffers. Data that populates system memory 232 includes the computer's operating system (OS) 234 and application programs 236.

The operating system 234 includes a shell 238, for providing transparent user access to resources such as application programs 236. Generally, shell 238 is a program that provides an interpreter and an interface between the user and the operating system. More specifically, shell 238 executes commands that are entered into a command line user interface or from a file. Thus, shell 238, also called a command processor, is generally the highest level of the operating system software hierarchy and serves as a command interpreter. Shell 238 provides a system prompt, interprets commands entered by keyboard, mouse, or other user input media, and sends the interpreted command(s) to the appropriate lower levels of the operating system (e.g., a kernel 240) for processing. Note that while shell 238 is a text-based, line-oriented user interface, the present disclosure will equally well support other user interface modes, such as graphical, voice, gestural, etc.

As depicted, the OS 234 also includes kernel 240, which includes lower levels of functionality for OS 234, including providing essential services required by other parts of OS 234 and application programs 236, including memory management, process and task management, disk management, and mouse and keyboard management. Application programs 236 in the system memory of computer 200 may include various programs and modules for implementing the methods described herein, such as the 3D printer control logic 242, and the 3D print files 244, and print jobs 246 (each print job including identification of a print file, any print options used during printing, and any options regarding an ultraviolet light source/guide such as pulse power and duration).

Elements depicted in computer 200 are not intended to be exhaustive, but rather are representative components suitable to perform the processes described herein. For instance, computer 200 may include alternate memory storage devices such as magnetic cassettes, digital versatile disks (DVDs), Bernoulli cartridges, and the like.

Figure 3:
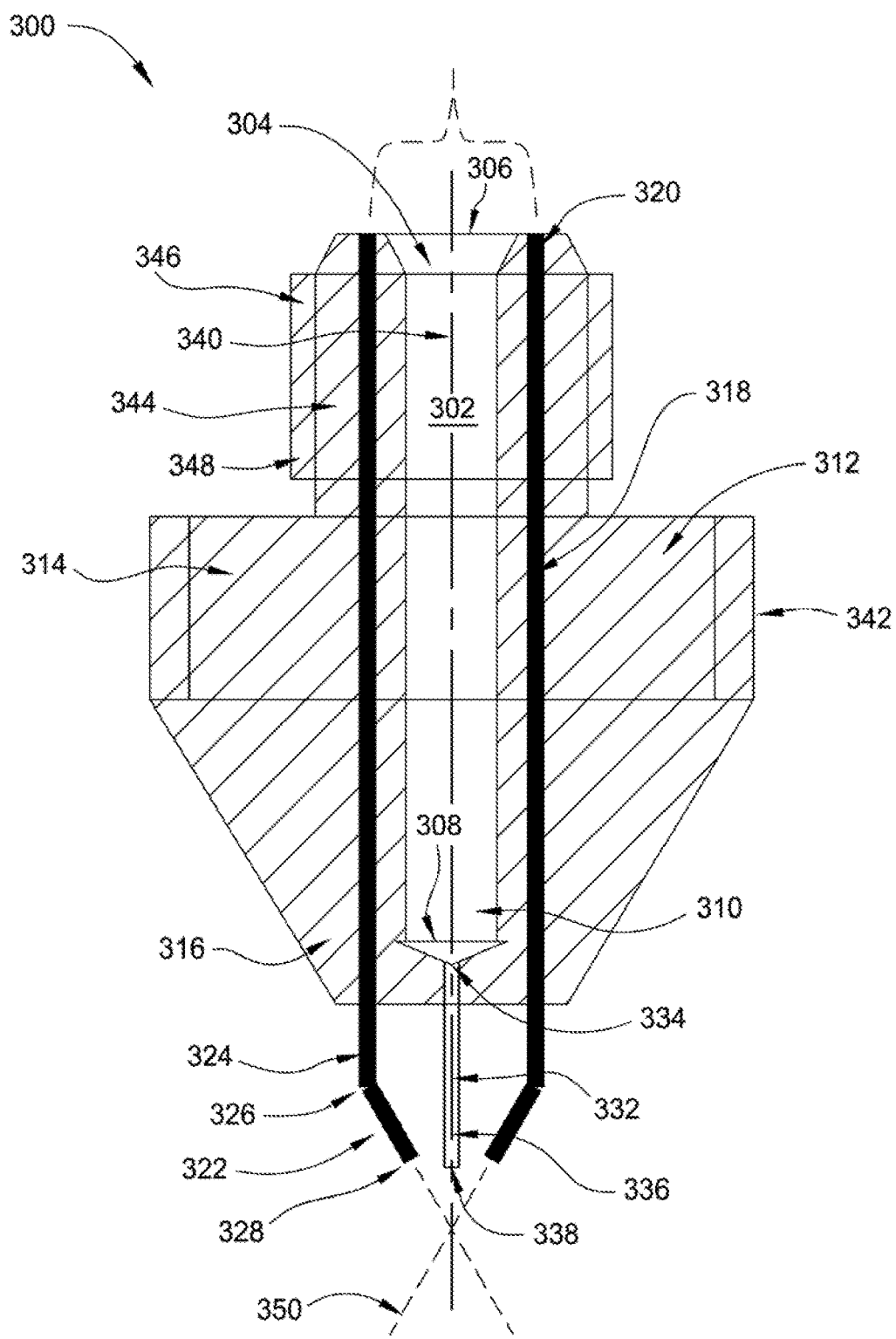
FIG. 3 illustrates a pulsed UV light nozzle according to some embodiments.

FIG. 3 illustrates a UV light nozzle 300 according to some embodiments. UV light nozzle 300 may be pulsed. Pulsed UV light nozzle 300 may be nozzle 112 of system 100. As shown in FIG. 3, nozzle 300 for a 3D printer has a material channel 302 having a proximal orifice 304 at a first end 306 and a distal orifice 308 at a second end 310. Material channel 302 flows material, such as filament, through material channel 302 from the first end 306 toward the second end 310. Proximal orifice 304 of material channel 302 has a tapered profile. The tapered profile of proximal orifice 304 promotes a pressure increase as material is passed into material channel 302. The increased pressure promotes flowability of material through material channel 302 and as it enters needle 332 through distal orifice 308. Distal orifice 308 of material channel 302 also has a tapered profile. The tapered profile of distal orifice 308 promotes a pressure increase as material is passed from material channel 302 into needle 332. The increased pressure promotes flowability of material through needle 332 through distal orifice 308.

Nozzle 300 has a body 312 having a first end 314 and a second end 316 opposite the first end 314. The second end 316 of the body is coupled to the second end 310 of the material channel. The body 312 circumscribes at least a portion of the material channel 302. Body 312 may have heating channels (not shown) for controlling the temperature of material flowing through material channel 302. Nozzle 300 has a connector 344 having a first end 346 and a second end 348. Second end 348 of connector 344 is coupled with first end 314 of body 312 and material channel 302. Connector 344 circumscribes at least a portion of material channel 302. First end 346 of connector 344 may be coupled with, for example, a distal end of extruding arm 110a of system 100.

An ultraviolet light guide 318 is coupled with body 312. Ultraviolet light guide 318 may be a light pipe or fiber. Ultraviolet light guide 318 may comprise a bulb. An ultraviolet light source (not shown) provides ultraviolet light to ultraviolet light guide 318. As shown in FIG. 3, ultraviolet light guide 318 is disposed within body 312. Ultraviolet light guide 318 has a first end 320 coupled with the first end 314 of body 312. Ultraviolet light guide 318 has a light-emitting tip 322 having a first end 326 coupled with a second end 324 of ultraviolet light guide 318. Light-emitting tip 322 also has a second end 328. During curing, ultraviolet light travels from first end 320 of ultraviolet light guide 318 to second end 324 of ultraviolet light guide 318. The ultraviolet light then travels from second end 324 of ultraviolet light guide 318 to first end 326 of light-emitting tip 322 and then to second end 328 of light-emitting tip 322. As shown in FIG. 3, ultraviolet light guide 318 is partially disposed within body 312, and light-emitting tip 322 is coupled with second end 316 of body 312. Light-emitting tip 322 extends beyond second end 316 of body 312. Light-emitting tip 322 is angled between about 0 and about 90 degrees, about 30 degrees and about 60 degrees, such as 45 degrees, toward a central axis 340 (shown by a dashed line) of nozzle 300. In some embodiments, guide 318 is a fiber amplifier or fiber laser.

Light-emitting tip 322 has an optical axis 350 that intersects a central axis 340 of nozzle 300 at a location beyond distal orifice 338 of nozzle 300. In such embodiments, ultraviolet light exits the second end 328 of light emitting-tip 322 and interacts with material exited from second end 336 of needle 332. The exited material may be flowing toward a substrate or may have already been deposited onto a substrate. In some embodiments, light-emitting tip is disposed adjacent needle 332 and/or material channel 302. In such embodiments, ultraviolet light exits the second end 328 of light emitting-tip 322 and interacts with material flowing from first end 306 of material channel 302 to second end 310 of material channel 302 and/or from first end first end 334 of needle 332 to second end 336 of needle 332. An outer surface 342 of body 312 has a tapered profile. A tapered profile of outer surface 342 allows ultraviolet light guides (not shown) to be coupled with outer surface 342 in addition to (or instead of) ultraviolet light guide 318. Embodiments described herein promote directing ultraviolet light toward a portion of a surface of a three dimensional object deposited on a substrate. The portion of the surface of the three dimensional object may be less than the entire surface of the three dimensional object, i.e. directing ultraviolet light toward a substrate is selective toward a portion of the object. Embodiments described herein further promote directing ultraviolet light toward at least a portion (or the entirety of) a material flowed through a material channel and/or material that has exited a nozzle of a 3D printer but has yet to be deposited onto a surface of a substrate. The portion of the material in a material channel and/or material exited a nozzle of a 3D printer may be less than the entirety of the material, i.e. directing ultraviolet light toward the material is selective toward a portion of the material.

Nozzle 300 has a needle 332 having a first end 334 coupled to second end 310 of material channel 302. The needle has a second end 336 having a distal orifice 338. A first portion at first end 334 of needle 332 is disposed within body 312 and a second portion of needle 334 including second end 336 extends beyond second end 316 of body 312. Distal orifice 338 has a diameter less than a diameter of material channel 302. A diameter of distal orifice 338 that is less than a diameter of material channel 302 promotes a pressure increase as material is passed from material channel 302 into distal orifice 338. The increased pressure promotes flowability of material through needle 332 and as it exits distal orifice 338. A central axis of nozzle 300 overlaps a central axis of material channel 302 and a central axis of needle 332. Light-emitting tip 322 extends beyond second end 316 of body 300, and second end 336 of needle 332 extends beyond second end 328 of light-emitting tip 322. This allows ultraviolet light emitted from light-emitting tip 322 to interact with material exited from needle 322 (either before or after contacting the substrate) without buildup of material on or near either first end 326 or second end 328 of light-emitting tip 322. A computer, such as computer 200, controls pulse parameters, such as pulse power, duration, and time delay in between two pulses, for use of ultraviolet light guide 318.

Figure 4:
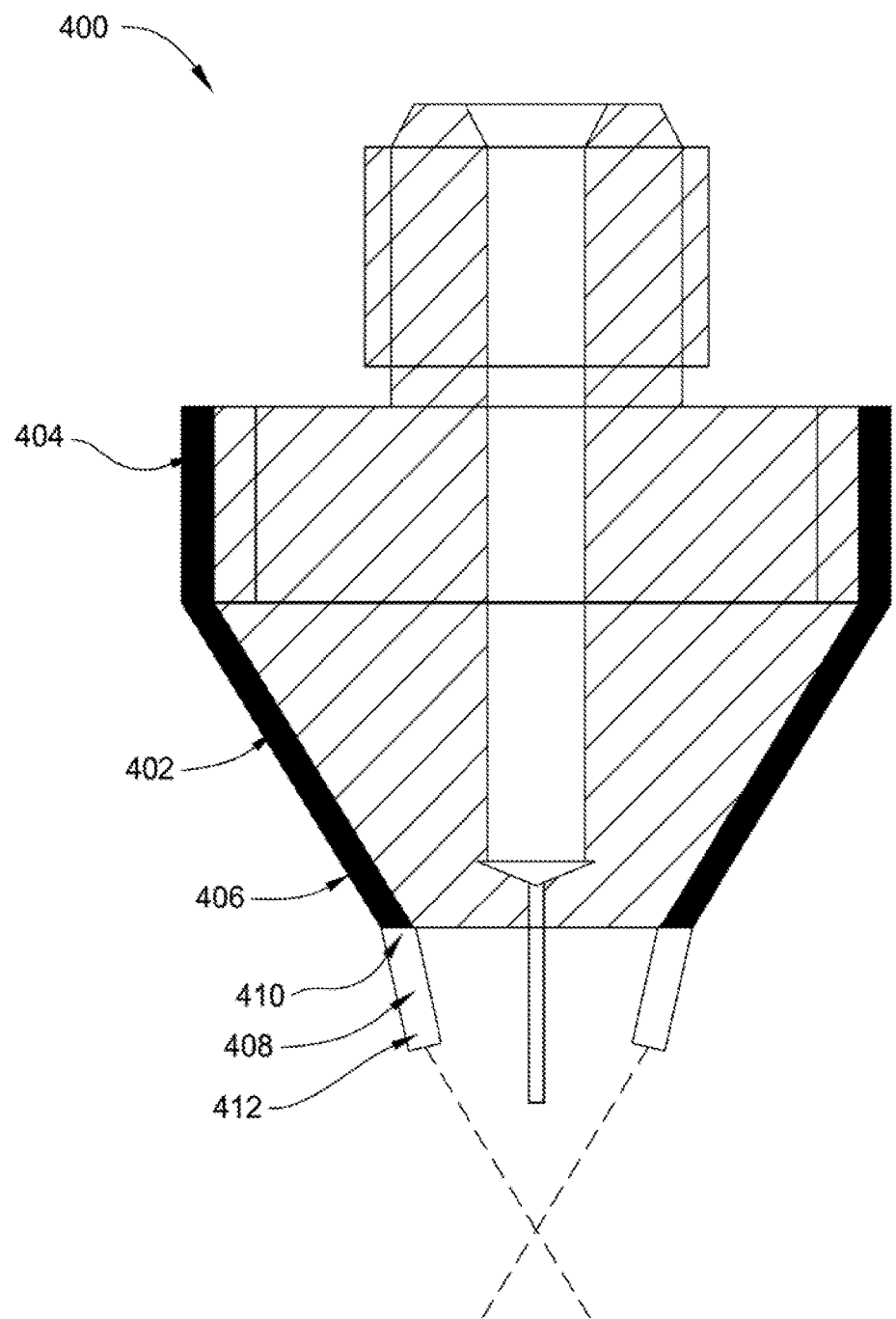
FIG. 4 illustrates a pulsed UV light nozzle according to some embodiments.

FIG. 4 illustrates a pulsed UV light nozzle 400 according to some embodiments. Pulsed UV light nozzle 400 may be nozzle 112 of system 100. As shown in FIG. 4, nozzle 400 for a 3D printer is substantially similar to nozzle 300 of FIG. 3, except ultraviolet light guide 402 is coupled with body 312 and ultraviolet light source 318 is not visible in FIG. 4. Ultraviolet light guide 402 is coupled with body 312. Ultraviolet light guide 402 has a first end 404 and a second end 406. Ultraviolet light source 402 has a light-emitting tip 408. Light-emitting tip 408 has a first end 410 and a second end 412, and first end 410 of light-emitting tip 408 is coupled with second end 406 of ultraviolet light guide 402. Outer surface 342 of body 312 has a tapered profile. A tapered profile of outer surface 342 allows ultraviolet light guide 402 to be coupled with outer surface 342. An ultraviolet light guide coupled with an outer surface 342 of body 312 allows convenient maintenance/replacement of damaged or worn out ultraviolet light guides and recyclability of body 312 and other components of nozzle 400.

Figure 5:
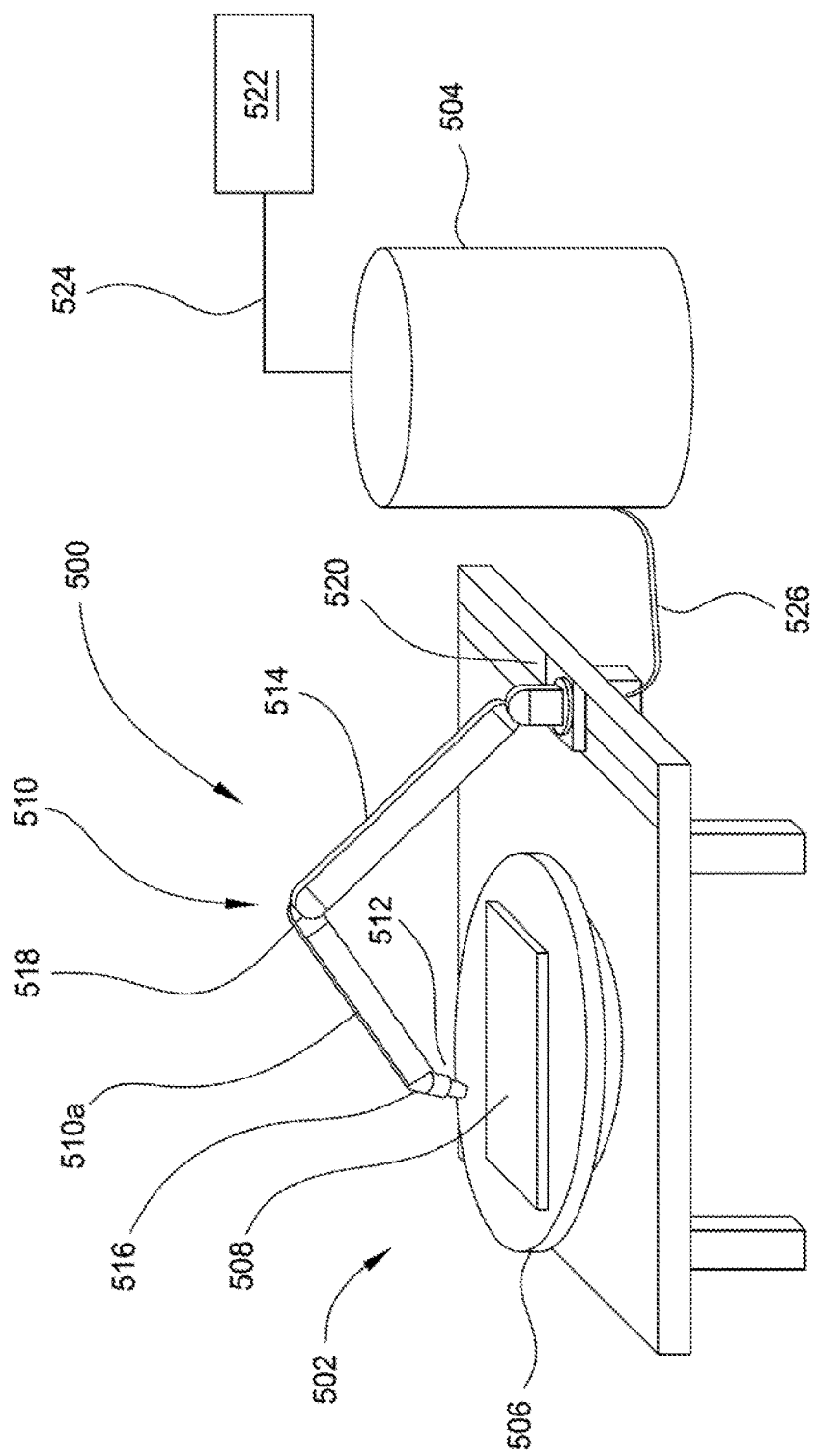
FIG. 5 is a schematic side view of a 3D printing apparatus according to some embodiments.

FIG. 5 is a schematic side view of a 3D printing apparatus 500 according to some embodiments. The apparatus 500 comprises a 3D printer 502 and a source 504 of a print medium containing a material (optionally dissolved in a solvent). The 3D printer 502 includes a stage 506 for a substrate 508, and a dispenser 510 for dispensing the print material onto substrate 508. Dispenser 510 has a dispensing arm 510a. The substrate 508 can be any suitable substrate for receiving a 3D printed object. Substrate 508 comprises one or more materials. Non-limiting examples of substrate materials include semiconductor wafers (e.g., silicon wafers), most metals, refractory materials, and other polymers. In some aspects, a substrate may be, without limitation, an electronic device, microchip, microelectronic device, printed circuit board, hard disk drive platter, a portion of fluid filter, and portion of a hydrocarbon (e.g., petroleum, natural gas, or petro-chemical) processing facility such as a pipe, pipeline, fluid pumping device, distillation column, a reaction vessel, or storage tank.

The stage 506 may comprise an x-y-z actuator for positioning the substrate 508 in three dimensions. The dispenser 510 may be actuated in one, two, or three dimensions. In FIG. 5, the dispenser 510 has a nozzle 512 coupled to an articulated positioning arm 514 with a 3-axis rotational positioner 516 coupled to a two-arm translation arm 518, which is in turn coupled to a carriage 520. Nozzle 512 may be nozzle 300 of FIG. 3 or nozzle 400 of FIG. 4. Such a positioning apparatus may be used to position the dispensing tip of the nozzle 512 at any location in three dimensions and pointing any direction. A source 522 of pressure, such as constant pressure, such as a pressurized gas, may be used to force the print material steadily through the nozzle 512. The source 522 of constant pressure is typically coupled by a conduit 524 to a head space inside the source 504 of print medium. The source 504 of print medium is coupled to the 3D printer 502 by a conduit 526 that may be a flexible or rigid tube or pipe. The conduit 526 is shown coupled to the 3D printer 502 at the carriage 520 in FIG. 5, but the conduit 526 may be coupled to the 3D printer at any convenient location from the carriage 520 to the nozzle 512.

Figure 6:
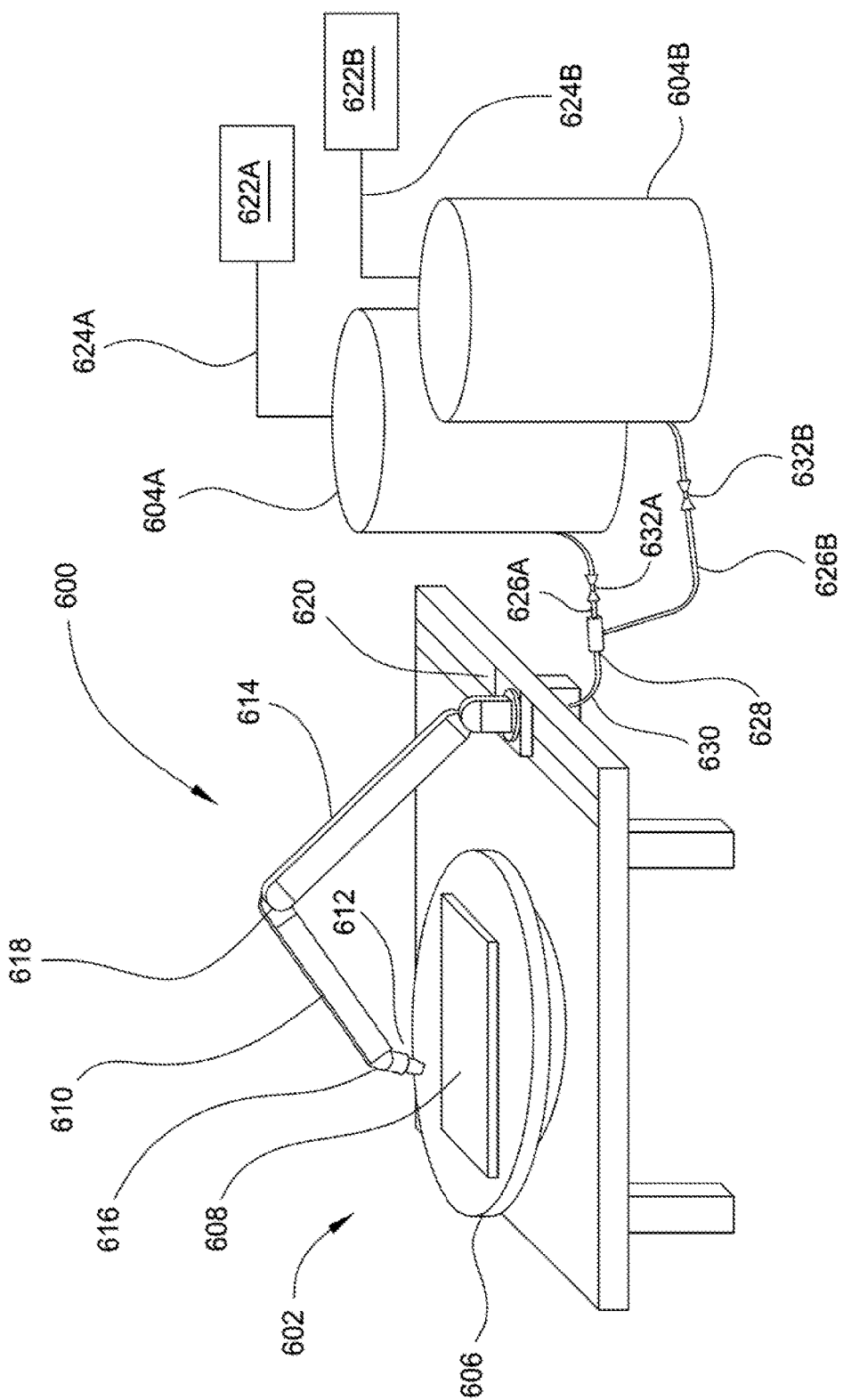
FIG. 6 is a schematic side view of a 3D printing apparatus according to some embodiments.

FIG. 6 is a schematic side view of a 3D printing apparatus 600 according to some embodiments. The apparatus 600 comprises the 3D printer 602 and two sources 604A, 604B of precursors for forming a print medium material. There are two sources 604A, 604B shown in FIG. 6 for illustration, but any number of sources may be used. In an embodiment where two sources 604A and 604B are used, the first source 604A may have a first precursor, precursor mixture, and/or material that is unreactive, and the second source 604B may have a second precursor, precursor mixture, and/or material that is unreactive, such that mixing the first and second precursor(s), precursor mixture(s), and/or material(s) forms a material, such as a monomer, oligomer, or polymer that may be capable of mixing, cross-linking, and/or self-polymerizing.

Each source 604A and 604B has a respective source 622A, 622B of pressure, such as constant pressure, coupled to a head space of each respective source 604A, 604B by a conduit 624A, 624B. Flow from each source 604A, 604B proceeds through a respective conduit 626A, 626B. A mixer 628 may couple the conduits 626A, 626B, such that a combined mixture is delivered through the connection conduit 630 to the 3D printer 602. The mixer 628 and connection conduit 630 may be temperature controlled to control the degree of reaction/mixing in the connection conduit 630. If no reaction is desired, the mixer 628 and connection conduit 630 may be cooled by jacketing with a cooling medium. Valves 632A, 632B may be provided to control flow of the first and second precursor mixtures from the respective sources 604A, 604B.

The mixer 628 is shown in FIG. 6 at a location before any precursor, precursor mixture, and/or material reach the 3D printer 602, but the mixer may be located anywhere between the sources 604A, 604B and the nozzle 612, for example on the articulated positioning arm 614.

An object may be made by 3D printing using the apparatus and methods described herein. A method of forming an object may include flowing a fluid containing a precursor, precursor mixture, and/or material, and optionally a solvent, to the nozzle of a 3D printer, heating the fluid to a temperature of at least about 50° C., dispensing the precursor, precursor mixture, and/or material in a pattern onto a substrate, and developing the fluid/material by curing the fluid/material as it flows from the nozzle and/or at the surface of the substrate with a selective ultraviolet light guide/source. For example, the precursor, precursor mixture, and/or material may be reacted and the material may be hardened by treating the object with ultraviolet radiation from an ultraviolet light guide/source coupled with the nozzle. Dispensing the precursor, precursor mixture, and/or material in a pattern may include forming a first film of the precursor/precursor mixture/material according to the film-formation processes described herein, and forming a second film of the precursor on the first film.

Precursors may be reacted together with other precursors. For example, a first mixture may contain a first precursor, a second mixture may contain a second precursor, and a third mixture may contain a third precursor, etc. Each of the first, second, and third mixtures, etc. may be flowed through a separate pathway to prevent premature reaction of the components. The first and second mixture, etc. may be mixed together at a desired time to start the reaction. For example, using the apparatus 600, the first and second mixtures, etc. may be mixed at the mixer 628.

Treating precursor, precursor mixture, and/or material with UV light may be accomplished by supplying ultraviolet light from a selective ultraviolet light guide at the nozzle of the 3D printer. For example, either nozzle 300 of FIG. 3 or nozzle 400 of FIG. 4 may be used with the apparatus 100, apparatus 500 or apparatus 600 to provide UV irradiation. The precursor(s), precursor mixture(s), and/or material(s) may be heated to at least 50° C. in the nozzle by the ultraviolet light and/or one or more heating channels within or around the nozzle. Precursor, precursor mixture, and/or material is dispensed onto the substrate in a pattern to form an object, and the object may be treated with ultraviolet light from a selective ultraviolet light guide, as described above, disposed on or within the nozzle. In some embodiments, a selective ultraviolet light guide/source will heat precursor(s), precursor mixture(s), and/or material(s) at a temperature of at least about 50° C., such as about 120° C. to alter one or more physical properties of a portion of the object, such as harden a portion of the object. Additionally or alternatively, the precursor(s), precursor mixture(s), and/or material(s) may be treated with UV light from a selective ultraviolet light guide in the nozzle, dispensed onto the substrate in a pattern to form a precursor object, and the object may be further treated with UV light from a selective ultraviolet light guide at a temperature of about 200° C. to alter one or more physical properties of a portion of the object. Directing ultraviolet light to an object or material may be made selective, e.g. to a localized portion on an object or material, depending on the angle of light emitting tip(s) on a nozzle, as described above. Directing ultraviolet light to an object or material may also be made selective by adjusting pulse parameters between two or more pulses, such as pulse intensity, pulse duration, and time delay in between two pulses. In some embodiments, pulse intensity is between about 0.1 mw/cm$^2$ and about 150 mw/cm$^2$, such as about 1 mW/cm$^2$ and about 100 mW/cm$^2$, such as 5 mW/cm$^2$ and about 50 mW/cm$^2$, such as about 10 mW/cm$^2$ and about 25 mW/cm$^2$. In some embodiments, a pulse duration is between about 2 seconds and about 40 seconds, such as about 10 seconds and 20 seconds. In some embodiments, a time delay in between two pulses is between about 1 second and about 6 seconds, such as about 2 seconds and about 4 seconds. Pulse parameters may be adjusted by opening/closing a shutter and/or pulsing a laser at a desired time to affect cure at a desired location on an object/material. A shutter and/or laser may be controlled by a computer, such as computer 102 or computer 200. Selective ultraviolet light irradiation of an object/material affords an ability to create portions of a material/object with different material properties, even where the material/object is comprised of a uniform material throughout the material/object.

Overall, methods and apparatus described herein provide improved flowability of material through a 3D printer nozzle and selective curing of both deposited material and material exited from a nozzle before deposition occurs. Nozzle architecture along with pulse parameters of methods and apparatus described herein afford selective ultraviolet light irradiation of an object/material. Selective ultraviolet light irradiation of an object/material affords an ability to create portions of a material/object with different material properties, even where the material/object is comprised of a uniform material throughout the material/object. Embodiments described herein promote directing ultraviolet light toward a portion of a surface of a three dimensional object deposited on a substrate. The portion of the surface of the three dimensional object may be less than the entire surface of the three dimensional object, i.e. directing ultraviolet light toward a substrate is selective toward a portion of the object. Methods and apparatus described herein further promote directing ultraviolet light toward at least a portion (or the entirety of) a material flowed through a material channel and/or material that has exited a nozzle of a 3D printer but has yet to be deposited onto a surface of a substrate. The portion of the material in a material channel and/or material exited a nozzle of a 3D printer may be less than the entirety of the material, i.e. directing ultraviolet light toward the material is selective toward a portion of the material. Methods and apparatus described herein allow ultraviolet light emitted from light-emitting tip to interact with material exited from a needle (either before or after contacting the substrate) without buildup of material on or near either first end or second end of light-emitting tip. Methods and apparatus described herein also allow convenient maintenance/replacement of damaged or worn out ultraviolet light guides and recyclability of body and other components of nozzle.

While the foregoing is directed to embodiments of the present disclosure, other and further embodiments of the disclosure may be devised without departing from the basic scope thereof, and the scope thereof is determined by the claims that follow.

The invention claimed is:

1. A nozzle for a 3D printer, the nozzle comprising:
    a body having a first end, a second end opposite the first end, and a material channel through the body, the material channel having a proximal orifice at the first end and a distal orifice at the second end,
    an ultraviolet light guide attached to the body, the ultraviolet light guide having a first end, a second end, and a light-emitting tip with a first end and a second end, the light-emitting tip extending beyond the second end of the body, wherein the first end of the light-emitting tip is coupled with the second end of the ultraviolet light guide, and
    a needle coupled to the distal orifice of the material channel, the needle having a first end and a second end, wherein the second end of the needle extends beyond the second end of the light-emitting tip.

2. The nozzle of claim 1, wherein the ultraviolet light guide is disposed through the body from the first end of the body to the second end of the body and the ultraviolet light guide circumscribes the material channel.

3. The nozzle of claim 1, wherein the needle has a diameter less than a diameter of the material channel.

4. The nozzle of claim 1, wherein the ultraviolet light guide is partially disposed within the body and the light-emitting tip is coupled with the second end of the body.

5. The nozzle of claim 1, wherein the ultraviolet light guide is a light pipe or fiber.

6. The nozzle of claim 1, wherein the light-emitting tip has an optical axis that intersects an axis of the material channel at a location beyond the distal orifice.

7. The nozzle of claim 6, wherein the needle has a diameter less than a diameter of the material channel, wherein the axis of the material channel overlaps an axis of the needle.

8. The nozzle of claim 6, wherein the light-emitting tip is angled between about 30 degrees and about 60 degrees toward the axis of the material channel.

9. The nozzle of claim 8, wherein the light-emitting tip is angled at about 45 degrees toward the axis of the material channel.

10. The nozzle of claim 1, wherein the proximal orifice has a tapered profile.

11. The nozzle of claim 1, wherein the distal orifice has a tapered profile.

12. The nozzle of claim 1, wherein an outer surface of the body has a tapered profile.

13. The nozzle of claim 1, further comprising a connector coupled to the proximal orifice, wherein the connector circumscribes at least a portion of the material channel.

14. The nozzle of claim 1, further comprising a second ultraviolet light guide coupled with the body, the second ultraviolet light guide having a first end, a second end, and a light-emitting tip with a first end and a second end, wherein the first end of the light-emitting tip is coupled with the second end of the second ultraviolet light guide.

15. The nozzle of claim 3, wherein the first end of the needle is disposed within the body.

16. A three dimensional printer comprising:
    a material spool;
    an extruder having a first end and a second end, wherein the extruder is coupled with the material spool at the extruder first end; and
    a nozzle coupled to the extruder second end, the nozzle comprising:
        a body having a first end, a second end opposite the first end, and a material channel through the body, the material channel having a proximal orifice at the first end and a distal orifice at the second end, wherein the second end of the extruder is coupled to the proximal orifice,
        an ultraviolet light guide attached to the body, the ultraviolet light guide having a first end, a second end, and a light-emitting tip with a first end and a second end, the light-emitting tip extending beyond the second end of the body, wherein the first end of the light-emitting tip is coupled with the second end of the ultraviolet light guide, and
        a needle coupled to the distal orifice of the material channel, wherein a second end of the needle extends beyond the second end of the light-emitting tip.

17. The three dimensional printer of claim 16, wherein the ultraviolet light guide is disposed through the body from the first end of the body to the second end of the body and the ultraviolet light guide circumscribes the material channel.

18. The three dimensional printer of claim 17, further comprising a print bed.

19. The three dimensional printer of claim 18, wherein the print bed is coupled with an X-axis motor, a Y-axis motor, and a Z-axis motor.

20. The three dimensional printer of claim 17, further comprising a computer coupled with the ultraviolet light guide.

21. The three dimensional printer of claim 20, wherein the computer is further coupled with the X-axis motor, the Y-axis motor, and the Z-axis motor.

22. The three dimensional printer of claim 17, wherein the needle has a diameter less than a diameter of the material channel.

23. The three dimensional printer of claim 17, wherein the ultraviolet light guide is partially disposed within the body and the light-emitting tip is coupled with the second end of the body.

24. The three dimensional printer of claim 17, wherein the ultraviolet light guide is a light pipe or fiber.

25. The three dimensional printer of claim 17, wherein the light-emitting tip has an optical axis that intersects an axis of the nozzle at a location beyond the distal orifice.

26. The three dimensional printer of claim 25, wherein the light-emitting tip is angled at about 45 degrees toward the axis of the nozzle.

27. The nozzle of claim 1, wherein the ultraviolet light guide is disposed through the body from the first end of the body to the second end of the body and the needle has a diameter less than a diameter of the material channel.

28. The nozzle of claim 1, wherein the ultraviolet light guide is partially disposed within the body and the light-emitting tip has an optical axis that intersects an axis of the material channel at a location beyond the distal orifice.

29. The nozzle of claim 1, wherein the needle has a diameter less than a diameter of the material channel, wherein the axis of the material channel overlaps an axis of the needle, and the light-emitting tip is angled between about 30 degrees and about 60 degrees toward the axis of the material channel.

* * * * *